United States Patent [19]
Olson et al.

[11] 3,908,455
[45] Sept. 30, 1975

[54] IN-BORE OPTICAL TELEMETRY SYSTEM
[75] Inventors: Larry R. Olson; William S. Watson, both of Dahlgren, Va.
[73] Assignee: The United States of America as represented by the Secretary of the Navy, Washington, D.C.
[22] Filed: July 30, 1974
[21] Appl. No.: 493,442

[52] U.S. Cl. .............................................. 73/167
[51] Int. Cl.² ........................................... G01L 5/14
[58] Field of Search .......... 73/167; 356/28; 250/234

[56] References Cited
UNITED STATES PATENTS
3,654,553    4/1972    Mary et al. ............................. 73/167
3,698,811    10/1972   Weil ........................................ 356/5

Primary Examiner—Donald O. Woodiel

[57] ABSTRACT

An optical means for obtaining data about the travel of a projectile down the barrel of a gun and through the air has means for generating an electrical signal representative of that data, a light emitting element, an optical detector and means for decoding the detected signal and recording the decoded signal. When the projectile is fired, physical phenomena such as acceleration, strain and temperature are detected, monitored and the data obtained is converted into electrical signals. These signals then drive a light emitting element which transmits an optical signal along an axis in alignment with the bore of the gun. The optical signal is then detected, decoded and recorded providing, at a remote location, data about the travel of the projectile.

8 Claims, 4 Drawing Figures

U.S. Patent  Sept. 30,1975  Sheet 1 of 3  3,908,455

IN-BORE OPTICAL TELEMETRY SYSTEM

BACKGROUND OF THE INVENTION

This invention relates to optical means for obtaining data about the flight of a projectile which has been fired from a gun, at a station remote from the gun.

When a projectile is fired from a gun, from the instant of its firing, through-out its travel down the barrel and into the air, a number of physical changes and forces influence its flight path. A knowledge of the forces and physical parameters, such as the shock and acceleration of thousands of "G's" imparted by the launching force, radial, axial and transverse acceleration of the projectile, strains, temperatures and voltages, of associated electrical systems can provide valuable insights as to why projectiles fail and how to improve accuracy, range and frequency of fire. It has long been known how to measure these parameters, but a long-standing problem has been to transmit several pieces or channels of data obtained substantially contemporaneously, in an effective, efficient, continuous and consistent manner through the entire travel of the projectile, from its launch through its flight in the air.

Previous systems for transmitting the data have focused on two methods. The first involves direct electrical transmission of the data by a wire attached to the front of the projectile and strung with controlled tension out the front of the gun's barrel, so that the wire is not permitted to contact the barrel. The internal electronics of the projectile are grounded to the gun barrel. This transmitting system has a number of inherent difficulties and limitations. The wire is suseptible of being broken when the projectile is only a short distance out of the gun, the wire gathering apparatus alters the travel of the projectile, and once the projectile leaves the gun, its electronics loses the ground-tie, preventing the collection of additional data. An example of such a system is described in U.S. Pat. No. 2,514,297.

Another data transmitting system uses a radio wave transmitter inside the projectile and a receiver outside the gun to relay the collected data. This type of system also has disadvantages. Due to the relatively long wave lengths of the electromagnetic transmission compared to the dimensions of the gun barrel, null points in transmission occur in which no signal is transmitted, thus disrupting the continuity of data transmission. An additional radio wave transmission system delays transmission of stored data until the projectile has left the gun barrel. This system, while avoiding the null point problem, is only capable of transmitting at most two channels of data in a single firing, and then only with complex and expensive memory storage and analog to digital conversion electronics. This both limits the amount of data that can be obtained from each shell firing and increases the expense and complexity of obtaining the data.

An optical system for transmitting the data is capable of overcoming all of these difficulties. No modifications to the external structure of the projectile which would alter its travel are necessary. The data obtained may be transmitted continuously through-out the travel of the projectile whether inside or outside of the gun barrel. No null points which would disrupt the continuity of data transmission occur. A large number of data channels may be utilized, and no largecapacity, expensive memory electronics need be employed.

Additionally, an optical system for transmitting the data is compatable with the vigorous environmental conditions imposed by the firing of a large-gun projectile. When the gun is fired, the projectile may experience accelerations in excess of 20,000 G's and shock in excess of 50,000 G's. Also, gases, vapors and particulates may accumulate in the rifling or all throughout the bore of the gun, or may be present due to the explosion which powers the projectile. When the projectile is launched, these light substances are hurled out the gun barrel at speeds which enable them to overtake the heavier projectile. An optical system for transmitting data about the projectile's flight can both withstand this hostile environment and function continuously under these adverse conditions.

No previous optical system is known which has been successful in transmitting data relating to the travel of a projectile, obtained by sensors located inside the projectile and by an optical source associated with the projectile.

SUMMARY OF THE INVENTION

Briefly, the invention comprises: means adapted to be associated with a projectile which is fired from a gun to generate electrical signals representative of the travel of the projectile down the gun barrel and through the air; a light emitting element for translating the generated signals into a modulated light beam which is transmitted along an axis in line with the bore of the gun; a detector located externally of the projectile for detecting the modulated light beam; and means for translating the detected beam into data representative of the travel of the projectile. The means for generating electrical signals representative of the travel of the projectile may be transducers, for example accelerometers, and necessary associated electronics to convert the physical data into coded electrical signals. These coded signals then drive the light emitting element, which emits a modulated light beam representative of the physical data. This beam is then detected and translated into data representative of the travel of the projectile. The light beam when modulated at 3.5 MHz, is capable of transmitting six channels of data plus one baseline, each with a frequency response of 100 KHz. If diodes of two or more colors are employed in one projectile, the number of channels may be multiplied.

The detector may be placed in line with the bore of the gun, at a distance from it, or may be placed off the axis of the bore. In the latter case, a frangible reflector is placed in line with the bore of the gun, and reflects the modulated light beam until the projectile passes through the reflector, shattering it.

STATEMENT OF THE OBJECTS OF INVENTION

An object of the invention is to obtain data representative of the travel of a projectile down the barrel of a gun and through the air by means of an optical source associated with the projectile.

Another object of the invention is to obtain data representative of several of the physical phenomena and forces influencing the travel of a projectile during a single firing down the barrel of a gun and through the air.

Yet another object of the invention is to obtain continuous data representative of the travel of a projectile down the barrel of a gun and through the air by means of an optical source which is associated with the projectile.

DESCRIPTION OF THE PREFERRED EMBODIMENT

Figure 1:
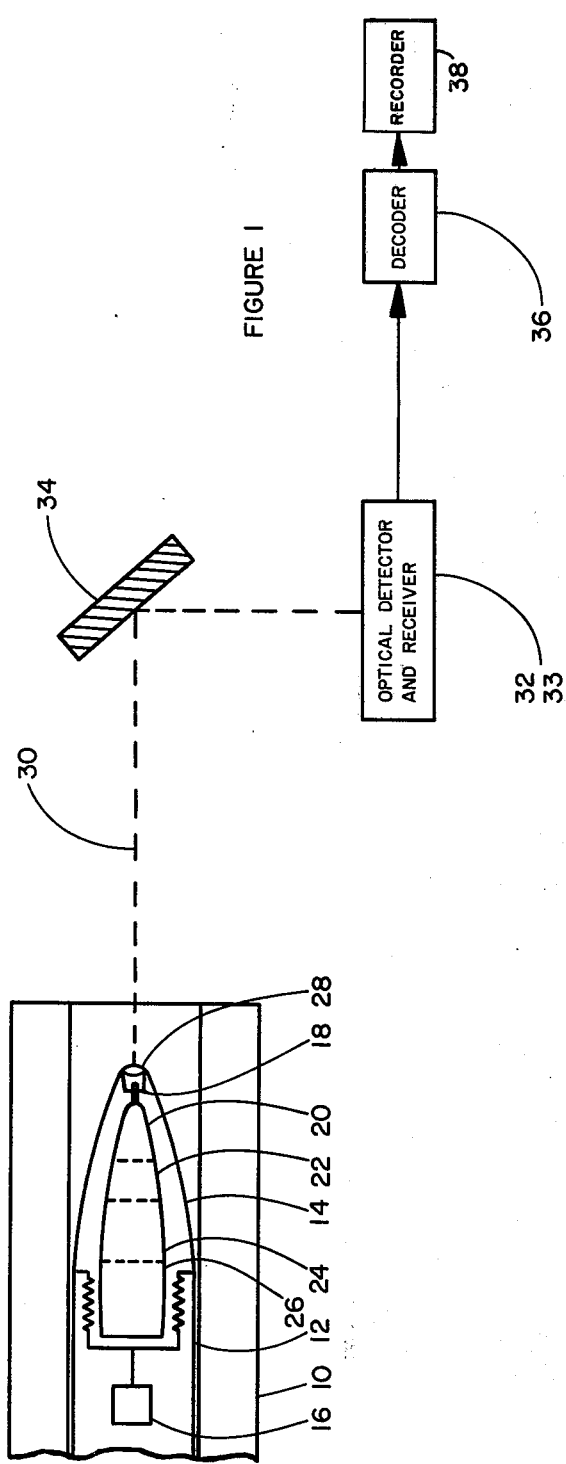
FIG. 1 is a block diagram illustrating the major components of the means for obtaining data representative of the travel of the projectile.

Referring to FIG. 1, the barrel 10 of a gun is shown, containing a projectile 12 having a nose assembly 14 which is screwed or otherwise appropriately fastened to the projectile 12. Contained within the projectile are one or more transducers 16 which may monitor a number of physical forces or phenomena which influence the travel of the projectile down the barrel of the gun and through the air and which are of interest in studying the firing of the projectiles. Some examples are; strain, radial, transverse and axial acceleration, temperature and voltage of associated electrical systems. The transducers 16, which may be any conventional transducers, generate electrical voltages representative of those physical forces or phenomena, and representative of the travel of the projectile.

A light emitting element 18, illustrated here by a light emitting diode, with the use of driving electronics 20, multiplexer modulator 22 and signal conditioner 24, emits a modulated beam of light, coded with the electrical voltages generated by transducers 16. Light emitting element 18 may be any of a number of commercially available components, such as a laser diode, but a light emitting diode has been found to be superior for the purposes of this invention. Light emitting element 18 and its associated electronics are powered by batteries 26, which may be any battery which will withstand the shock and acceleration of launch, such as nickel cadmium or mercury batteries.

The modulated light beam emitted by emitting element 18 is projected by lens system 28 along an axis 30 which is aligned with the bore of the barrel of the gun. Optical detector 32 and receiver 33 are positioned to receive and detect the modulated beam, and may be placed either directly in alignment with axis 30, or may be positioned off-axis, as shown in the embodiment in FIG. 1. When detector 32 and receiver 33 are positioned off-axis, frangible reflector 34 is placed in line with axis 30, to reflect the beam to the receiver and detector. Reflector 34 may be any frangible, reflective surface, such as aluminized or otherwise reflective Mylar (registered trademark) or reflective Plexiglas (registered trademark). Detector 32 and receiver 33 receive the modulated light beam and translate the beam back into a digital electrical voltage signal representative of the travel of the projectile. The decoder 36 then converts this digital signal to analog voltages, representative of each of the data channels transmitted. These voltages are then recorded by the standard voltage recorders 38.

Figure 2:
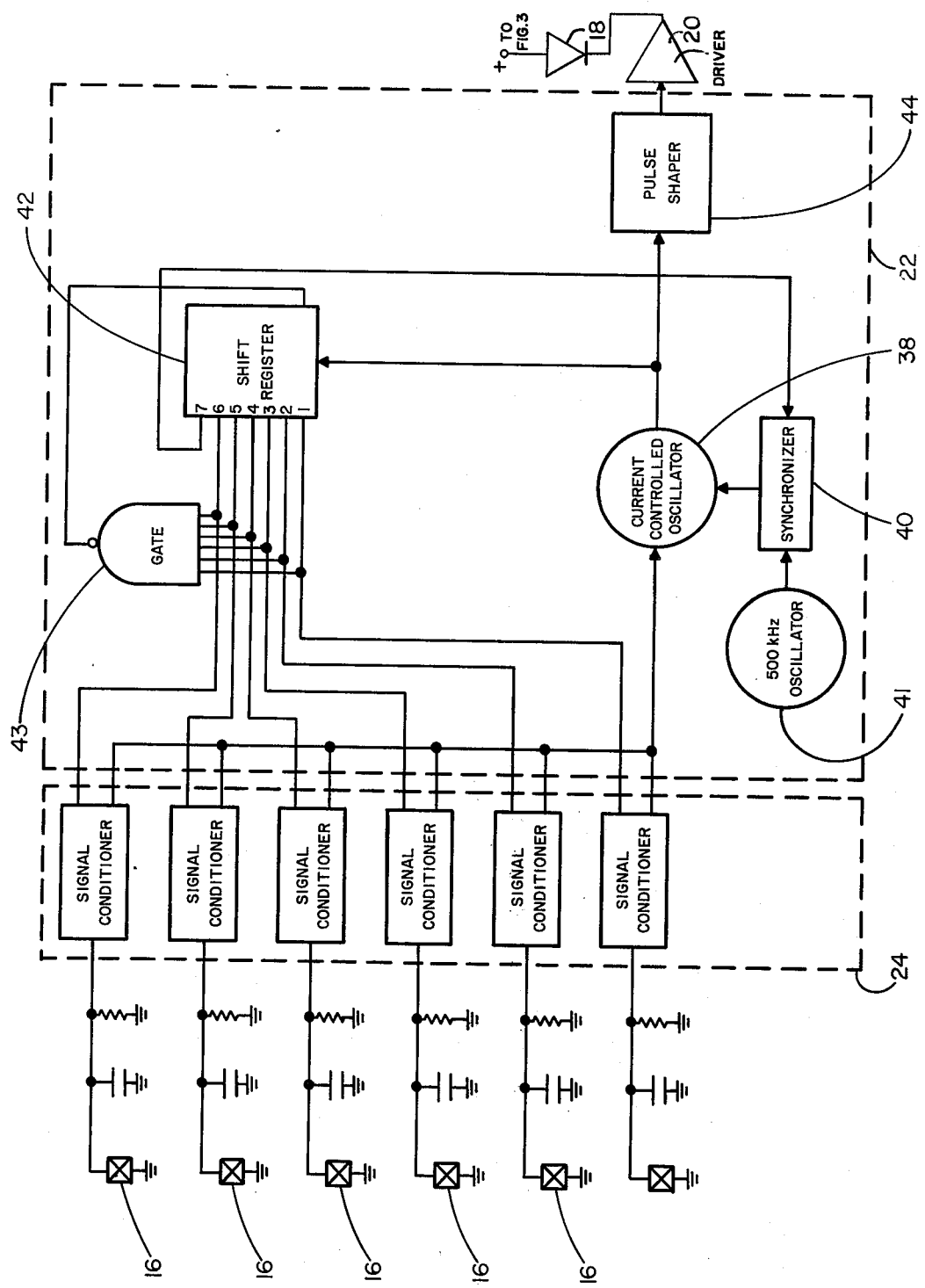
FIG. 2 is a block diagram illustrating the components for detecting and monitoring the physical phenomena or forces to be measured, for converting this data into an optical signal, and for transmitting the optical signal, all carried within the projectile.

Turning now to FIG. 2, transducers 16, as previously described, monitor physical phenomena or forces such as strain or acceleration which influence the travel of the projectile down the gun barrel and through the air. There may be any number of transducers, but it has been found convenient to use six transducers, as illustrated in FIG. 2 and referred to hereinafter. The output of transducers 16 are electrical voltage signals representative of the values of the physical phenomena or forces detected. These voltage signals are applied to signal conditions 24 which scale the voltage signals to a level which will not saturate or overload the light emitting element 18, illustrated by the light emitting diode in FIG. 2, and also convert these voltages to proportional current levels. The conditioned transducer output signals are next combined into a single signal more appropriate to be applied to the light emitting diode by means of multiplexer and modulator electronics 22. Multiplexer and modulator 22 comprises a current controlled oscillator 38, a synchronizer 40, a shift register 42, and NAND gate 43.

Shift register 42 in conjunction with NAND gate 43 sequentially samples each of the conditioned transducer output currents from each of the six transducers 16. As each of the output currents is sampled the current is also applied to current controlled oscillator 38. Current controlled oscillator 38 converts this current to a 40 to 240 nanosecond interval or null, preceeded by a 40 ns pulse. This 40–240 ns interval is representative of the value of the conditioned transducer signal. The termination of this 40–240 ns interval causes shift register 42 to advance, allowing current controlled oscillator 32 to sample the next successive conditioned transducer output current. After all six of the transducer output currents have been sampled, a base line signal of variable width is impressed on the current controlled oscillator output by synchronizer 40 and oscillator 41, two thousand nanoseconds after the start of the first 40–240 ns signal has been seen on the oscillator output. The width of the base line signal will thus be two thousand ns minus the total of the six 40–240 ns intervals and the six 40 ns pulses, and will vary from a minimum of 320 ns to a maximum of 1520 ns.

It will be noted that the present invention is not limited to the use of six data channels to transmit information about the flight of the projectile. Any number of channels may be used which can be successfully coded, transmitted and decoded. For example, by using a red and green light emitting diode and simply expanding shift register 42 to accomodate 12 channels, 12 data channels may be transmitted.

Figure 4:
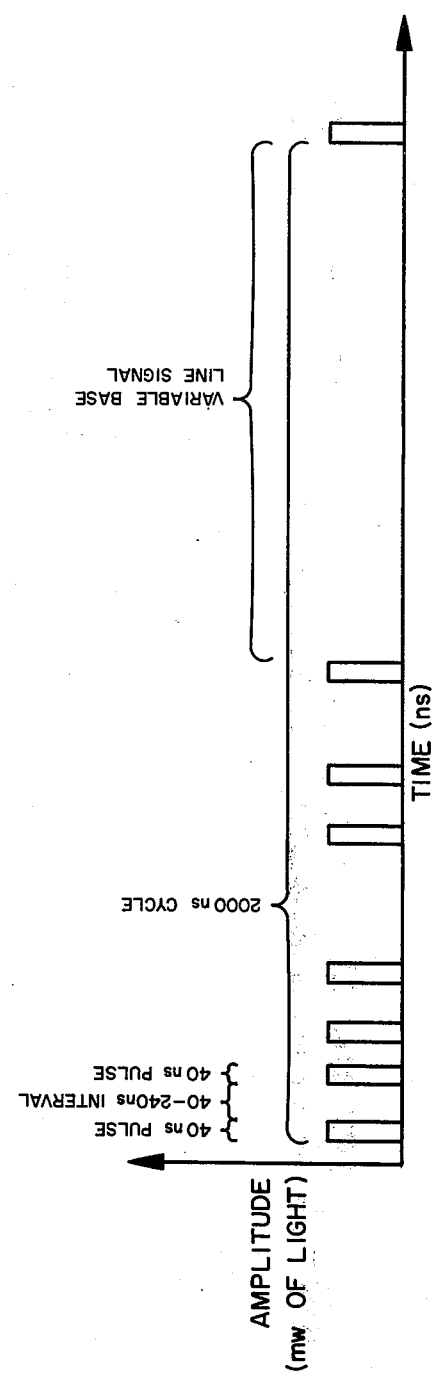
FIG. 4 is an illustration of a typical cycle of data transmitted optically by the light emitting element, containing six data channels and a base line.

The output signal of the current controlled oscillator is next shaped by pulse shaper 44. Pulse shaper 44 may be a "one-shot" which provides a constant width pulse when a variable width pulse is applied to it, thus increasing the accuracy of the transmitted signal. The shaped, current controlled oscillator output signal is next applied to the driver 20 which supplies an amplified current to light emitting diode 18 at 40–240 ns intervals corresponding to the 40–240 ns intervals between pulses of the current controlled oscillator output signal. The light emitting diode 18 then emits a modulated light beam representative of the physical phenomena or forces detected by transducers 16. A typical cycle of six data signals and a baseline signal transmitted by the light emitting diode is illustrated in FIG. 4. Light emitting diode 18 may be any commercially available light emitting diode such as the Meret, Inc. TLC24 model or the Monsanto Co. ME1 model.

Figure 3:
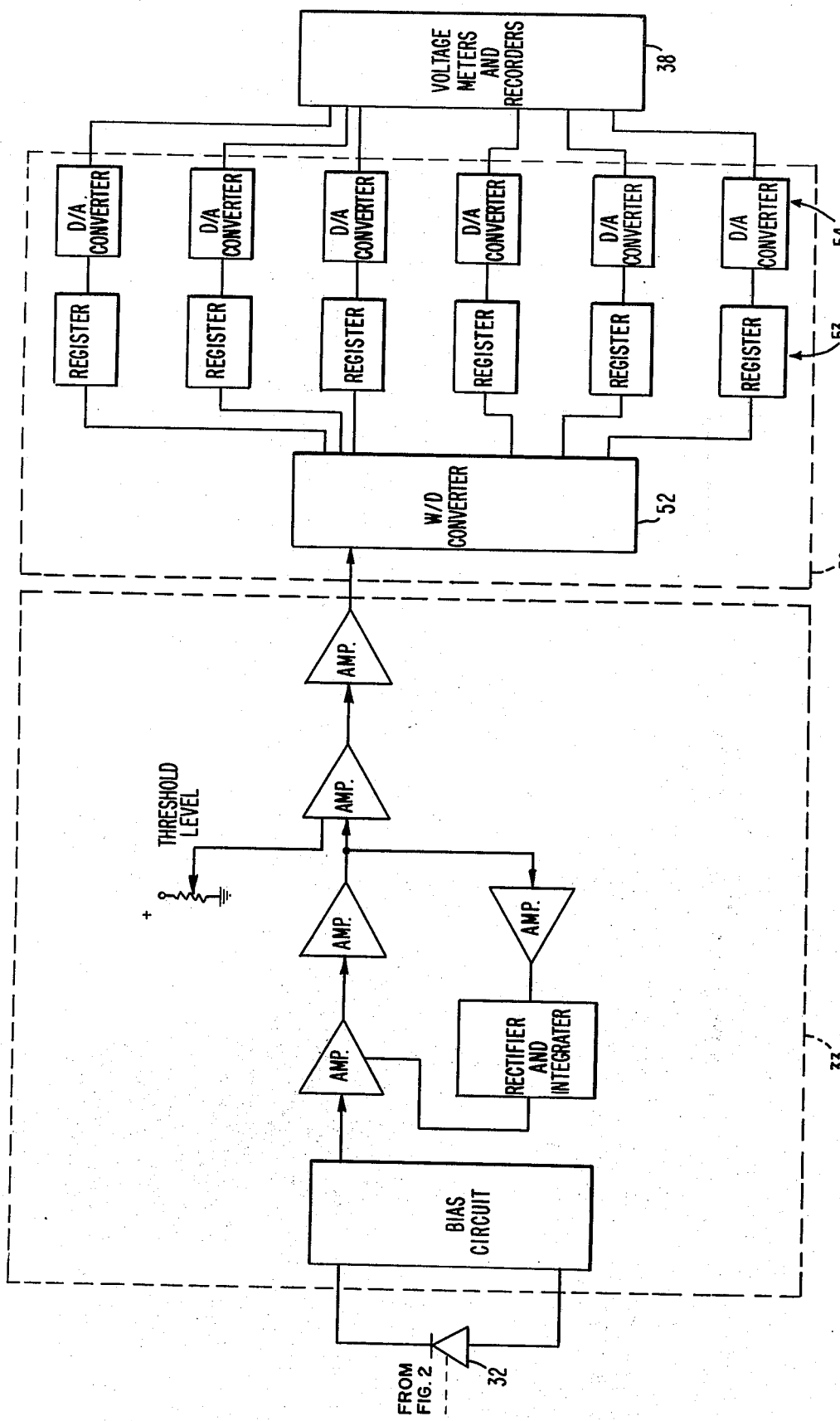
FIG. 3 is a block diagram illustrating the ground-based components for detecting and receiving the optical signal, converting it to electrical voltage signals and recording those voltage signals.

The modulated light beam emitted by light emitting diode 18 is transmitted, as described previously, along an axis in line with the bore of the gun. The signal may then be reflected to or may be directly incident on an optical detector 32, such as the silicon photodiode of FIG. 3. The optical detector and its associated electronics are located remotely from the gun. Silicon photodiode 32 generates an electrical voltage signal in response to the optical signal emitted by light emitting diode 18. This silicon photodiode output signal is similar to the current signal which drives light emitting diode 18, but is several magnitudes smaller. The output current signal of diode 32 is applied to a receiver 33 which primarily amplifies but also shapes the signal generated by the silicon photodiode. The output of the receiver 33 is thus a series of analog pulse intervals. This output is next applied to the decoder 36 which by means of width to digital (W/D) converter 52 converts the width of each of these analog pulse intervals into a binary word. These words, each representative of the output of one of the transducers 16, are then sequentially stored in the one of the six registers 53 which is assigned to receive the data representative of that transducer. These six binary words (for each data-sampling cycle) are then applied to the six corresponding digital to analog (D/A) converters 54 and converted back into analog voltages. These analog electrical voltages are used to drive conventional voltage meters and recorders 38. The values thus recorded by meters 38, after proper calibration, give values of the physical phenomena or forces which have been detected and monitored by the transducers 16 in the projectile 12. Thus data has been obtained about the flight of a projectile which has been fired from a gun, at a station remote from the gun, by optical means.

What is claimed is:

1. Apparatus for obtaining data representative of the travel of a projectile down the barrel of a gun and through the air comprising:
    means adapted to be mounted in the projectile for generating electrical signals representative of the travel of the projectile;
    a light emitting element adapted to be mounted in the nose of the projectile and electrically connected to said signal generating means for translating said signals into a modulated light beam transmitted along an axis in line with the bore of the gun and out the muzzle;
    a detector for detecting the modulated light beam; and
    means electrically connected to said detector for translating the detected beam into data representative of the travel of the projectile down the barrel of the gun and through the air.

2. The apparatus of claim 1 wherein the light emitting element is a light emitting diode.

3. The apparatus of claim 1 wherein the light emitting element is a laser diode.

4. The apparatus of claim 1 wherein the detector is positioned off the axis of the bore of the gun and a frangible reflector is positioned on said axis whereby the modulated light beam is reflected toward the detector.

5. The apparatus of claim 4 wherein the frangible reflector is a reflective-coated Plexiglas sheet.

6. The apparatus of claim 4 wherein the frangible reflector is a reflective-coated Mylar sheet.

7. The apparatus of claim 1 wherein the signal generating means includes means for multiplexing the generated electrical signals.

8. The apparatus of claim 2 wherein the detector is positioned off the axis of the bore of the gun and a reflective-coated Plexiglas sheet is positioned on said axis whereby the modulated light beam is reflected toward the detector.

* * * * *